United States Patent
Leenhoven et al.

(10) Patent No.: US 11,906,340 B2
(45) Date of Patent: Feb. 20, 2024

(54) SEPARATION ASSEMBLY FOR A TREATMENT OF A MULTIPHASE FLUID FOR ACCURATE FLOW MEASUREMENT OF A GAS AND A LIQUID PHASE IN A MULTIPHASE FLUID MIXTURE AND A SEPARATION METHOD PROVIDED BY SAID ASSEMBLY

(71) Applicant: L'ATELIER DE MATOURNE S.A.S, Flayosc (FR)

(72) Inventors: Ton Leenhoven, Flayosc (FR); Goncalo Gil Vieira Amaro, Atouguia (PT)

(73) Assignee: L'ATELIER DE MATOURNE S.A.S., Flayosc (FR)

( * ) Notice: Subject to any disclaimer, the term of this patent is extended or adjusted under 35 U.S.C. 154(b) by 0 days.

(21) Appl. No.: 17/914,514

(22) PCT Filed: Mar. 22, 2021

(86) PCT No.: PCT/EP2021/057281
§ 371 (c)(1),
(2) Date: Sep. 26, 2022

(87) PCT Pub. No.: WO2021/191153
PCT Pub. Date: Sep. 30, 2021

(65) Prior Publication Data
US 2023/0120000 A1    Apr. 20, 2023

(30) Foreign Application Priority Data

Mar. 27, 2020 (EP) .................................... 20166322

(51) Int. Cl.
*G01F 15/08*     (2006.01)
*B01D 19/00*    (2006.01)

(52) U.S. Cl.
CPC ......... *G01F 15/08* (2013.01); *B01D 19/0057* (2013.01); *B01D 19/0063* (2013.01)

(58) Field of Classification Search
CPC .. G01F 15/08; B01D 19/0057; B01D 19/0063
(Continued)

(56) References Cited

U.S. PATENT DOCUMENTS

| | | | |
|---|---|---|---|
| 5,209,765 A | 5/1993 | Kolpak et al. | |
| 6,863,712 B1 | 3/2005 | Gonda et al. | |

(Continued)

FOREIGN PATENT DOCUMENTS

| | | |
|---|---|---|
| CN | 205858319 U | 1/2017 |
| EP | 3885020 B1 | 6/2022 |
| WO | 2004080566 A1 | 9/2004 |

OTHER PUBLICATIONS

Decision to Grant a European Patent dated Jun. 2, 2022 in related/corresponding EP Application No. 20166322.6.
(Continued)

*Primary Examiner* — Alexander A Mercado
*Assistant Examiner* — Rodney T Frank
(74) *Attorney, Agent, or Firm* — PATENT PORTFOLIO BUILDERS PLLC

(57) ABSTRACT

A separation assembly for the flow measurement of a gas flow and a liquid flow of a multiphase fluid includes separator with a housing and a separation element inside the housing. The separation element provides the fluid to rotate at high-speed causing strong centrifugal forces on the multiphase fluid. The housing has an inlet for a multiphase mixture and two outlets, one primarily for pre-separated gas and the second primarily for pre-separated liquid. These outlets lead to a regulator. The regulator is part of the separation assembly and includes at least two outlets, one for gas and one for liquid. The regulator ensures the propor-
(Continued)

tional regulation and the final separation of gas and liquid phases over an entire flow rate to provide monophase liquid and gas at the outlets of the regulator.

8 Claims, 1 Drawing Sheet

(58) Field of Classification Search
USPC .............................................. 73/200 C, 200
See application file for complete search history.

(56) References Cited

U.S. PATENT DOCUMENTS

| | | |
|---|---|---|
| 2010/0269696 A1 | 10/2010 | Sarshar et al. |
| 2012/0297986 A1 | 11/2012 | Suda et al. |
| 2019/0321890 A1* | 10/2019 | Lescoche ............ C04B 38/0003 |

OTHER PUBLICATIONS

Extended European Search Report dated May 25, 2020 in related/corresponding EP Application No. 20166322.6.
Intention to Grant dated Dec. 13, 2021 in related/corresponding EP Application No. 20166322.6.
International Search Report and Written Opinion dated Jun. 15, 2021 in related/corresponding International Application No. PCT/EP2021/057281.

* cited by examiner

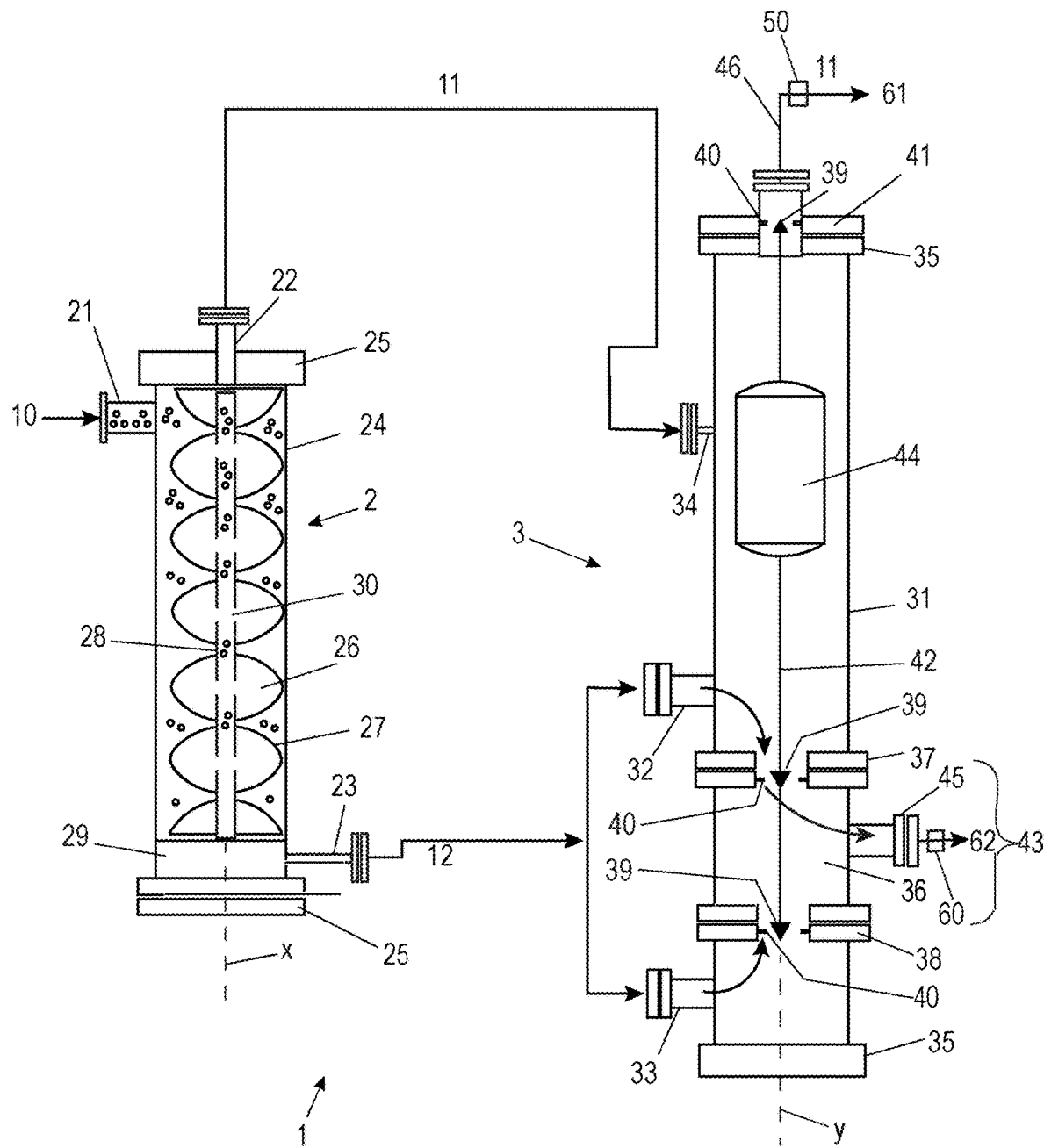

SEPARATION ASSEMBLY FOR A TREATMENT OF A MULTIPHASE FLUID FOR ACCURATE FLOW MEASUREMENT OF A GAS AND A LIQUID PHASE IN A MULTIPHASE FLUID MIXTURE AND A SEPARATION METHOD PROVIDED BY SAID ASSEMBLY

TECHNICAL FIELD

Today, in most cases the crude oil production of oil and gas wells are periodically brought to welltest separators where the multiphase production fluid mixture is separated in its gas and liquid phases in order to achieve qualitative valuable flow measurements of the oil and gas phases by single phase flow meters. Several wells may produce to a manifold, which leads the commingled production flow to a production separator for separating the gas out of the liquid phase and in case of three phase separators also separate the water from the oil phase for further processing and individual measurement of the total production quantities.

Unfortunately operating this way, does not allow continuous monitoring of the production and characteristics of each individual well independently. Understanding of the reservoir characteristics become unprecise and difficult.

The current invention relates to a cheap and easy separation assembly for the accurate flow measurement of a gas and a liquid flow in the multiphase mixture. Such a mixture can occur in oil and/or gas wells.

More specifically, the field of application as a separation assembly can be part of a flow measurement arrangement which is small, light enough to be positioned close to the well head or at the well head and cheap enough to be installed at even smaller producing oil/gas wells.

BACKGROUND

Standard flow measurement technology requires single phase media, which can be either a liquid or a gas phase for a highly accurate measurement.

Crude oil comprises a mix of gases and liquids and to a certain extent also solids. Conventional measurement is performed by separating the phases before the flow measurement by single phase flow meters. Two-phase- or Three-phase-separation is performed mainly by gravity separator vessels. Since these vessels are extremely large, heavy, expensive, and maintenance intensive the industry is looking for a long time for a better solution.

One of these solutions combines gravimetrical separation forces with centrifugal forces. In order to avoid pressure vessels, pipe-based systems are being used to overcome the PED-regulations (Pressure Equipment Directive). Those systems are known as GLCC, Gas Liquid Cylindrical Cyclone. Accuflow in California is one of the suppliers that is partly based on such system.

Other attempts are going in the direction in building real multiphase flowmeters (MPFM). Those MPFM did so far not overcome several issues to be widely adaptable for applications for every well head. In general, these flowmeters are difficult to calibrate, commission, and operate in the field. They are also very expensive and often not as accurate as required and some MPFM are also based on unfavorable nuclear technology.

CN 205 858 319 U discloses a multiphase separation metering device. It is provided with a spiral guide ring that functions as an agitator to support separation by gravity. This document does not provide any prevention of gas carry under. The valve of the separator below the spiral guide ring is closed under normal working conditions. When it is opened the regulator is unable to prevent gas carry under in presence of a gas slug and does not provide a regulation. When the valve below the spiral guide ring is closed there is no flow below the spiral guide and therefore no separation by this element. The regulator is only provided to allow a regulation of the gas outlet by acting of an upper valve inside the regulator but not the fluid outlet. A connection between the float and the lower valve of the regulator does not exist. A cylindrical float guide is provided with openings allowing fluid to pass through. The regulator separates a fluid before it has passed the spiral guide ring. The only transfer of liquid or gas seems to be by the passages 3 and 4 in the separator, where the fluid lead through the lower valve of the separator is directed to a metering device without any further separation.

WO 2004/080566 A1 discloses a cyclonic degasser. The cyclonic effect might be used for a separation of gas and liquid. The swirl formed by the cyclonic effect can be compared to an intensive stirring of the liquid causing the bubbles to be agitated and accumulated. A swirl will be generated which has a large depth. Reference is also made to FIG. 17a of US 2012/0297986 A1, which shows why a separator with the working principle of a cyclonic degasser needs to be long due to the depth of a generated swirl. Therefore, a large separation space is needed below a cyclone generator. Which renders the construction expensive and hard to adopt to construction requests. In a second approach for the cyclonic effect a vessel with a larger diameter is needed that the cyclone can be formed. However, the current invention allows a high separation performance within a compact version of a separator. A further example for a cyclonic degasser is disclosed by US 2010/0269696 A1, especially in FIG. 3 a cyclone generator is provided at the top of the separator and a long space below the cyclone generator is needed for the generation of a swirl. Although a separation is possible, the separation efficiency by the cyclonic principle is lower than in other principles, so that a larger amount of gas bubbles remains in the separated liquid.

U.S. Pat. No. 5,209,765 discloses a separator construction with a regulator system requiring an external energy source for the operation of the valves and the sensors and probably a motor as well to enhance the separation quality. The document discloses a chamber system as a part of a separator formed by a spiral duct. The regulator is provided with a rotating drum 40 according to FIG. 1 that is provided by bearings 44 and moved by a belt drive 48 via a motor 50. Alternatively, in FIG. 3 the regulator is provided with a drum 96, which can be rotated by direct drive via a motor 104. Both regulator types can be compared to a centrifugal separator which is driven by an external force with external power.

U.S. Pat. No. 6,863,712 B1 can be considered to be the closest state of the art towards the current invention. It describes a separation process for clean lube oil and is entirely based on centrifugal forces and utilizes a filter-technology with a gas-permeable and liquid-impervious membrane to discharge a separated liquid and gas phase. The disadvantage of this system is that the membrane requires a clean liquid phase free of solid impurities of any kind. Therefore, this system is not suitable to measure crude oil.

Exemplary embodiments of the invention are directed to providing an accurate and easy to operate solution for wellhead flow measurement which is cheap enough to be used on the majority of wells, including small producing wells.

BRIEF DESCRIPTION OF THE DRAWING FIGURE

The sole FIGURE illustrates a separation assembly according to the invention.

DISCLOSURE OF THE INVENTION

A separation assembly can be provided for a pretreatment before or prior to a flow measurement of a gas phase and a liquid phase in a multiphase fluid according to the invention comprises
- a) a separator as part of the separation assembly with
  - a1 a housing and a separation element inside the housing, wherein the separation element is to provide rotation to the fluid, preferably at high-speed creating strong centrifugal forces, wherein the housing further comprises an inlet for a multiphase mixture and two outlets, one primarily for per-separated gas with some remaining liquid and the second primarily for pre-separated liquid with some remaining gas.
  - a2 wherein these outlets lead to a regulator
- b) wherein the regulator is part of the separation assembly and comprises at least two outlets, one for pure (liquid free) gas and one for pure (gas free) liquid, wherein the regulator is provided to ensure the final separation and regulation of gas and liquid phases over the entire flow rate range of the separator assembly to provide monophase liquid and gas at the outlets of the regulator.

The separation element is formed to provide a rotating flow to the incoming multiphase crude oil fluid flow. This rotation is understood as a centrifugal separation of gas and liquid inside the multiphase crude oil fluid also referred to as multiphase mixture.

The gas can be guided to a separate outlet, so the liquid is guided in single phase to a liquid outlet.

The separation element may preferably be stationary with respect to the housing. The housing of the separation element is also standing still with respect to the environment. No rotatable parts are included in the construction of the separator element.

The separation assembly is suitable for the use in oil wells, where the composition of the multiphase fluid may vary over the time as well as the flow velocity.

The separation element is a screw, preferably an Archimedes type screw, wherein the form of the separation element is providing a rotation to the incoming multiphase mixture due to the helical pathway of the screw. This is causing the gas phase to be separated from the liquid phase of the mixture due to their different densities.

The separation in the separator is by centrifugal force. Other techniques in the state of the art further depend on gravimetrical forces and a certain retention time within a vessel causing additional dampening on the to be measured flow parameters. This dampening distorts the accurate measurement that is important to best understand the well and formation characteristics. The inventive assembly is therefore easy to control and provides more real-time and accurate flow measurement data.

The screw can be provided with a central channel. Gas can enter this central channel by openings, preferably inside a screw shaft. The openings can be provided at an end section of the channel opposite to the gas outlet of the separator. The channel can be provided inside a screw shaft. The screw shaft can therefore be hollow.

A fluid collection space can be provided at the bottom of the separator, where the outlet primarily for the liquid is provided.

The separator housing is a pipe and preferably not a vessel according to the PED-regulation 2014/68/EU. This facilitates the mechanical construction and operation of the whole assembly in many ways such that the assembly is not subject to regular pressure tests according to PED.

The regulator regulates the outlet flow lines, pre-separated gas and liquid, according to varying quantities of incoming liquid and gas flow. It comprises a housing, preferably a pipe, wherein the housing is provided with a liquid outlet and a gas outlet. In order to finalize the separation to achieve a monophase liquid and gas flow, the regulator is further provided with at least one float to operate with a gas and/or liquid outlet of the regulator, especially the float operates the valves for opening or closing the outlets, such that the valves of the outlets can be regulated form opened state and a completely closed state.

The regulator may be provided with at least one balanced valve system enabling the regulator to handle large differential pressure of the liquid and/or the gas between the separation assembly and a pipe pressure of a liquid line connected to the separation assembly. This way the float may be able to operate the valves even if there is high pressure at the valve that would otherwise prevent the valves from being opened by the buoyancy force of the float once closed.

The outlet valves of the regulator are provided such that the liquid valve closes if only gas is provided to the regulator or the gas valve closes if only liquid is provided to the regulator. The provision can be reached by a mechanical connection of the valves to the float.

The balanced valve system is pressure balanced to operate under high differential pressure between the pressure inside the housing and outside of the housing, wherein the valve system comprises at least two valves, wherein the valve system is balanced such that one valve closes under pressure when its partner valve opens under the same pressure. This way the valve assembly is always free to operate properly regardless of the pressure difference across the valve seat. In other words, the valves counterbalance the effect pressure in the assembly would have on the valve system.

At least one of the balanced valve systems may be provided to regulate the flow of the liquid at the liquid outlet. Additionally, a gas valve may be connected to this balanced valve system in order to regulate the gas outlet of the regulator.

The separation assembly can be provided with a flowmeter for measuring the gas flow at the gas outlet of the regulator.

The separation assembly can be also provided with a flowmeter for measuring the liquid flow at the liquid outlet of the regulator. Preferably the flowmeter can be adapted to also measure the water-cut of the liquid and other parameters.

An inventive method for operating an inventive separation assembly for the flow measurement of a gas flow and a liquid flow in a multiphase mixture comprises the following steps
- a) introducing the multiphase fluid into the separator of the separation assembly where it is pre-separated into a first flow mainly comprising liquid and a second flow mainly comprising gas b) transferring the pre-separated gas and liquid flows from the separator to the regulator, for controlling the output of gas to a gas line at the gas outlet of the regulator and output of the liquid to a liquid line at the liquid outlet of the regulator c) measuring the liquid flow and/or the gas flow leaving the separate outlets of the separation assembly with a flow meter.

Pre-separated means that the gas flows with some remaining liquid carry over and the liquid with some remaining gas carry under from the separator to the regulator.

Brief Description of the Sole Drawing

Some advantageous embodiments for inventive separation assembly are further explained in detail below together with the sole drawing. Specific parts of the different embodiments can be understood as separate features that can also be realized in other embodiments of the invention. The combination of features described by the embodiment shall not be understood as a limitation for the invention:

The sole FIGURE is a schematic view of the separation assembly according to the invention.

DETAILED DESCRIPTION

A part 1 of an embodiment of an inventive separator assembly 1 according to the invention is shown in the sole FIGURE.

The separator assembly 1 comprises a separator 2 for the separation of a multiphase fluid. The fluid may comprise gas, such as natural gas, and a liquid. The liquid may be crude oil, a mixture of oil and water. The multiphase fluid may further comprise solid particles such as impurities from the reservoir.

The separator assembly 1 further comprises a first flowmeter 50 for the determination of the gas flow 61 leaving the separator assembly 1.

The separator assembly 1 also comprises a second flowmeter 60 for the determination of the liquid flow 62 leaving the separator assembly 1. The second flowmeter may preferably be adapted to determine the water-cut of the liquid leaving the separator assemble 1. A suitable flowmeter may be a Coriolis flowmeter. Several models of commercial-available Coriolis flowmeters exist that are able to detect the water-cut. However, the flowmeters fail when gas, such as gas bubbles, are included in a multiphase fluid.

A good separation of fluid and gas must be performed first, so that the flow of the different phases in the multiphase fluid can be determined correctly. This separation is achieved by a separator 2 and a regulator 3.

In the following description a first stage of the treatment of the multiphase fluid is referred to the treatment in the separator 2 and a second stage of the treatment of the multiphase mixture is referred to the treatment in the regulator 3.

The separator 2 comprises an inlet 21 for the multiphase fluid 10 and at least two separate outlets 22, 23 for the gas 11 and the liquid 12 that are pre-separated from each other inside the separator.

The separator 2 further comprises a housing 24, which can preferably be made of a standard pipe. This way the separation assembly 1 is not subject to any PED-regulations (Pressure Equipment Directive). The separation assembly 1 can be used on onshore oil wells but can also be adapted for offshore and subsea applications.

The housing 24 has two end plates 25 at the bottom and at the top of the housing 24 for the terminal closure of the tubular housing 24. The tubular housing defines a longitudinal axis X. Although the housing is not limited to the form of the pipe, it is however preferred that the housing 24, or at least the inner surface of the housing is rotational symmetrical around the longitudinal axis X to have a uniform distance to a centrally placed screw 26, which is a further part of the separator 2. The screw 26 is provided with at least one thread, which forces the incoming multiphase fluid into a helical direction and thus due to the flow guidance of the screw thread a phase separation is performed by centrifugal forces. This way the gas inside the multiphase fluid is forced in a medial direction and the fluid is forced in a lateral direction.

The inlet 21 might be arranged at the housing in a way that the multiphase fluid may enter the housing in a medial direction to the screw 26, The thread of the screw 26 may be formed by one or more helical auger blades 27. In a preferred embodiment the screw 26 may be designed as a worm screw. Most preferably the screw 26 may comprise helical auger blades 27. The screw can preferably be formed as an Archimedean screw.

The screw 26 is preferably stationary mounted inside the housing 24.

The screw may further comprise a hollow screw shaft 28 for the removal of the separated gas towards the outlet 22 for the gas out of the separator 2. The hollow shaft 28 may be one piece, especially monolithic, with the thread, especially the auger blades 27. It might also be possible that the hollow screw shaft 28 is a tube and the auger blades 27 are separate parts of the screw, which are connected to the screw shaft 28.

The screw shaft 28 is further provided with multiple openings 30 along the axis X, where gas can enter the central channel formed by the hollow screw shaft 28. The longitudinal axis of the screw shaft 28 may be collinear to the longitudinal axis X of the housing 24. The liquid is guided by the screw 26 towards the bottom. The outlet 23 for the fluid is near the bottom of the housing 24. The housing 24 further comprises a collection space 29 at the bottom of the housing, which space is at least partly below the screw 26. The inlet 21 is positioned near the top of the screw 26.

After separation the fluid 12 is transferred to the second stage to the regulator 3. The gas 11 is also transferred to the regulator 3.

The regulator 3 also comprises a housing 31, preferably made of a pipe. The housing 31 is provided with two inlets 32 and 33 for the fluid and an inlet 34 for the gas. The two inlets 32 and 33 are part of a balanced valve system 43, which is adapted for pressure compensation.

More specifically a balanced valve system 43 is provided with two inlets 32 and 33 that are positioned at different distance from the bottom of the housing 31. The housing 31 has end plates 35 at the end position of the housing, wherein one end plate forms the bottom and the other one forms the top plate of the housing 31.

Between the two inlets 32 and 33, the valve system 43 comprises a middle section 36. The valves 37, 38 are controlled in a way that both valves can open and close simultaneously and are connected by a rod 42.

Each valve of the valve system 43 may comprise a valve plug 39 and a corresponding valve seat 40. In FIG. 1 the valves, preferably the valve plugs 39, are mechanically connected by a rod 42 or other suitable means, which is preferably rigid. The liquid valves 37, 38, preferably the valve plugs may be also mechanically connected to a gas valve 41 for the control of the outtake of gas from the regulator 3 at the top of the housing 31, which may also comprise at least a valve plug 39 and a valve seat 40. An outlet for gas 46 is positioned at the top of the regulator 3. The mechanical connection between the valves 37, 38, and 43 can be achieved by the rod 42.

For proportional response to level differences between the liquid phase and the gas phase, the rod 42 may be connected to a float 44, which can be connected by the rod or may be part of the rod. The float 44 is positioned between the gas phase and the liquid phase and changes its position with the fill level of liquid inside the regulator housing.

An outlet 45 for the liquid phase out of the regulator is provided.

The position of the float 44 determines the regulation of the valves 37, 38 and 41.

The valves can also be operated electrically or pneumatically by an actuator, which communicates with a sensor which determines the position of the float.

The system shown in FIG. 1 can also be changed by the addition of more regulators which can be connected to each other.

Some details of the separation assembly 1 will be further described. It should however be pointed out again, that it is generally considered difficult to perform an accurate multiphase flow measurement of water, oil, and gas quantities. Also, a multiphase measurement with a commercially available MPFM is considered very expensive.

A valid approach would be the use of a highly accurate Coriolis meters for the liquid phase measurement, but unfortunately this measurement principle becomes void in the presence of (free) gas that is coming simultaneously with oil and water from the well or reservoir.

The current invention has the general idea to provide a good separation system of the liquid and gas phases to be accurately measured by highly accurate and conventional flowmeters and which remains within an affordable price and demands a small footprint as requested for a reservoir monitoring system.

Over time several experiments were performed by the market during the development of the current invention on different constructions. However, in most cases two or three phase welltest separators are being used to determine the performance of a well in regular intervals by use of highly accurate single-phase flow meters for gas and liquid. Such welltest separators are still big and bulky and have to comply with the pressure vessel PED codes (ASME/AD 2000) etc. They are either stationary connected to a set of wellheads or installed on portable units and are carried around to the wells to be checked and verified. For some wells the liquid retention time within the separator vessel is dampening the flow dynamics of a well so much that their interpretation by the reservoir engineer becomes difficult to impossible.

Therefore, the preferred embodiment of the current invention does not rely on a standard static vessel and any retention time and provides real-time flow data.

In the measurement equipment of the system prequalified tubes and flanges, i.e., according 3.1B, were used as a housing for the separator 2 as well as for the regulator 3.

The gas is extracted from the multiphase water/oil mixture according to the current invention by using centrifugal forces. The helicoid, preferably Archimedean, screw 26 of the separator 2 may be therefore placed into a standard tube that is the housing of the separator 2, in order to introduce these centrifugal forces. The regulator 3 regulates proportionally the pre-separated gas and liquid phases discharged from the separation 2 and avoids the liquid mixture getting into the gas line and vice versa gas goes into the liquid line.

At a first stage of the separation in the separator 2 a helical passage way is created by the Archimedes screw to impart a spiral motion of the fluid. The centrifugal force urges the fluid radially outwards, which forces the less dense gas radially inwards. The gas is pressed by the liquid through small holes 30 preferably in the bottom section of the central passage way 28 and is then discharged into the second stage.

As a second stage of the system 1, the float 44 resides in the regulator. At the top of the regulator, a small gas relief valve may be positioned and at the bottom a "balanced liquid valve system" may be positioned.

The float is connected via a rod 42 with the gas valve 41 and the balanced liquid valves 37 and 38 and operates them according to and to maintain the liquid level within the regulator. A balanced liquid valve system is needed to neutralize the possible pressure difference between the separation assembly 1 and the outside environment. A single ported valve would, once closed, be kept tightly closed by the pressure difference across the valve and the float buoyancy force would be not strong enough to overcome this force and reopen the valve when required by rising liquid level in the regulator 3.

A quantity increase of the liquid, water oil mixture, will fill more room inside the tube 31, for the float to rise. The rising float 44 will unseat proportionally both liquid valves 37 and 38, and closes the gas valve 41 proportionally, in order to maintain a constant liquid level in the tube.

A falling fluid level will react in the opposite way and the valves 37 and 38 will close while the gas valve 41 will be opened. A constant liquid level in the tube of regulator 3 reliably regulates the separation assembly 1 according to the changing flow rates and mixes of the multiphase flow of an oil well. Water and oil mixture is therefore prevented from going into free gas pipe 46 and gas from going into the water and oil pipe 45.

Since the fluid 62 in the water/oil pipe 45 towards the flowmeter 60, which is preferably a Coriolis meter, is now free of gas, the flowmeter is now able to accurately measure the mass quantity and its density of the water oil mix correctly.

Based on the Coriolis density of the mix the water-cut (water-oil ratio) can be calculated by the Chevron equation of delta density of water and oil.

Since gas 61 in the gas pipe 46 towards the flowmeter 50, which is preferably an ultrasonic meter, is now free of liquid, it is able to accurately measure the volume quantity of the gas flow correctly.

It might be apparent from the figures and from the description above that the separation assembly is mechanically operated without the need of a motor and without electrical energy. In other words, the separation assembly is operated powerless, which means only with the energy of the flow that enters the separator assembly.

The separation is process-driven and self-regulated. The separation assembly and the separation process has an autarky from external mechanical work or electrical energy.

Compared to cyclonic separators, where an excessive space is needed below the cyclone generator, the screw 26 of the separator may extend over at least 30%, more preferably at least 50%, most preferably at least 85% over the length of the housing 24 of the separator 2.

As shown in FIG. 1, the outlets 22, 23 of the separator are provided on opposite sides of the screw, wherein the liquid is guided by a liquid line to an inlet of the regulator device.

A liquid line is finishing in the housing 31 of the regulator 3 upstream to the liquid outlet 45 of the housing 31.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCES 1 separation assembly
2 separator
3 regulator
10 multiphase fluid
11 pre-separated gas
12 pre-separated liquid
21 inlet
22 pre-separated gas outlet
23 pre-separated fluid outlet
24 housing
25 end plates
26 screw
27 auger blades
28 screw shaft
29 collection space
30 openings
31 housing
32 pre-separated fluid inlet
33 pre-separated fluid inlet
34 pre-separated gas inlet
35 end plates
36 middle section
37 liquid valve, pressure close
38 liquid valve, pressure open
39 valve plug
40 valve seat
41 gas valve for the gas outlet
42 rod
43 balanced valve system for the liquid outlet
44 float
45 liquid outlet
46 gas outlet
50 flowmeter for measuring the gas flow
60 flowmeter for measuring the liquid flow
61 gas outlet of pure gas
62 gas free liquid outlet
X longitudinal axis

The invention claimed is:

1. A separation assembly for flow measurement of a gas flow and a liquid flow of a multiphase fluid, wherein the separation assembly comprises: a) a separator with a housing and a separation element inside the housing, wherein the separation element is configured to rotate the multiphase fluid by flow velocity, wherein the housing further comprises an inlet for a multiphase mixture and first and second separator outlets, the first separator outlet is for pre-separated gas with some remaining liquid and the second separator outlet is for pre-separated liquid with some remaining gas, wherein the first and second separator outlets lead to a regulator, b) wherein the regulator is part of the separation assembly and comprises a least two regulator outlets, a first one of the at least two regulator outlets for liquid free gas and a second one of the at least two regulator outlets for gas free liquid, wherein the regulator is configured to ensure a final separation of gas and liquid phases over an entire flow rate range to provide monophase liquid and gas at the at least two regulator outlets, wherein the separation assembly includes a first flowmeter configured to measure a gas flow of the liquid free gas at the first one of the at least two regulator outlets, wherein the separation assembly includes a second flowmeter configured to measure a liquid flow of the gas free liquid at the second one of the at least two regulator outlets, wherein the separation element is stationary with respect to the housing, wherein the separation element is an Archimedes-type screw, wherein a form of the separation element provides a rotation to the incoming multiphase fluid so that different densities of oil and the gas force the gas and the liquid of the multiphase fluid to separate due to a helical pathway of the Archimedes-type screw, wherein the regulator comprises a housing in the form of a pipe, wherein the housing includes the at least two regulator outlets, the first one of the at least two regulator outlets is a gas outlet and the second one of the at least two regulator outlets is a liquid outlet, and wherein, in order to regulate the separation to achieve a monophase liquid and gas flow, the regulator further includes at least one float to regulate the gas or liquid outlet of the regulator, wherein the regulator further comprises at least one balanced valve system enabling the regulator to handle differential pressure between the separation assembly and a pipe pressure in a liquid line coupled to the liquid outlet of the regulator, wherein the at least one balanced valve system comprises at least two valves, and wherein the float is connected to a rod configured so that the rod opens the first one of the at least two regulator outlets when the rod closes the at least two valves of the at least one balanced valve system and the rod closes the first one of the at least two regulator outlets when the rod opens the at least two valves of the at least one balanced valve system.

2. The separation assembly of claim 1, wherein the Archimedes-type screw has a central channel into which the gas is guidable by openings in the Archimedes-type screw.

3. The separation assembly of claim 2, wherein the central channel is provided inside a hollow screw shaft.

4. The separation assembly of claim 1, wherein a bottom of the separator includes a fluid collection space where the second separator outlet is arranged.

5. The separation assembly of claim 1, wherein the housing of the separator is a pipe.

6. The separation assembly of claim 1, wherein the at least one balanced valve system is pressure balanced to operate under differential pressure between a pressure inside the housing of the regulator and outside of the housing of the regulator, wherein the valve system is balanced such that a first one of the at least two valves closes under pressure while a second one of the at least two valves opens under a same counter pressure, such that the closing of the first one of the at least two valves and the opening of the second one of the at least two valves counterbalance an effect pressure in the separation assembly would have on the at least one balanced valve system.

7. The separation assembly of claim 1, wherein the at least one balanced valve system is configured to regulate the flow of the liquid at the liquid outlet of the regulator.

8. A method for operating the separation assembly of claim 1 for flow measurement of a gas flow and a liquid flow in a multiphase fluid, the method comprising:
   a) introducing the multiphase fluid into the separator of the separation assembly, wherein the multiphase fluid is pre-separated into a first flow mainly comprising liquid and a second flow mainly comprising gas;
   b) transferring the pre-separated gas and liquid from the separator to a regulator for final separation and controlling an output of the gas flow to a gas line at a gas outlet of the regulator and output of the liquid flow to a liquid line at the liquid outlet of the regulator; and
   c) measuring the liquid flow or the gas flow leaving the gas and liquid outlets of the separation assembly with a flow meter.

\* \* \* \* \*